Patented July 16, 1940

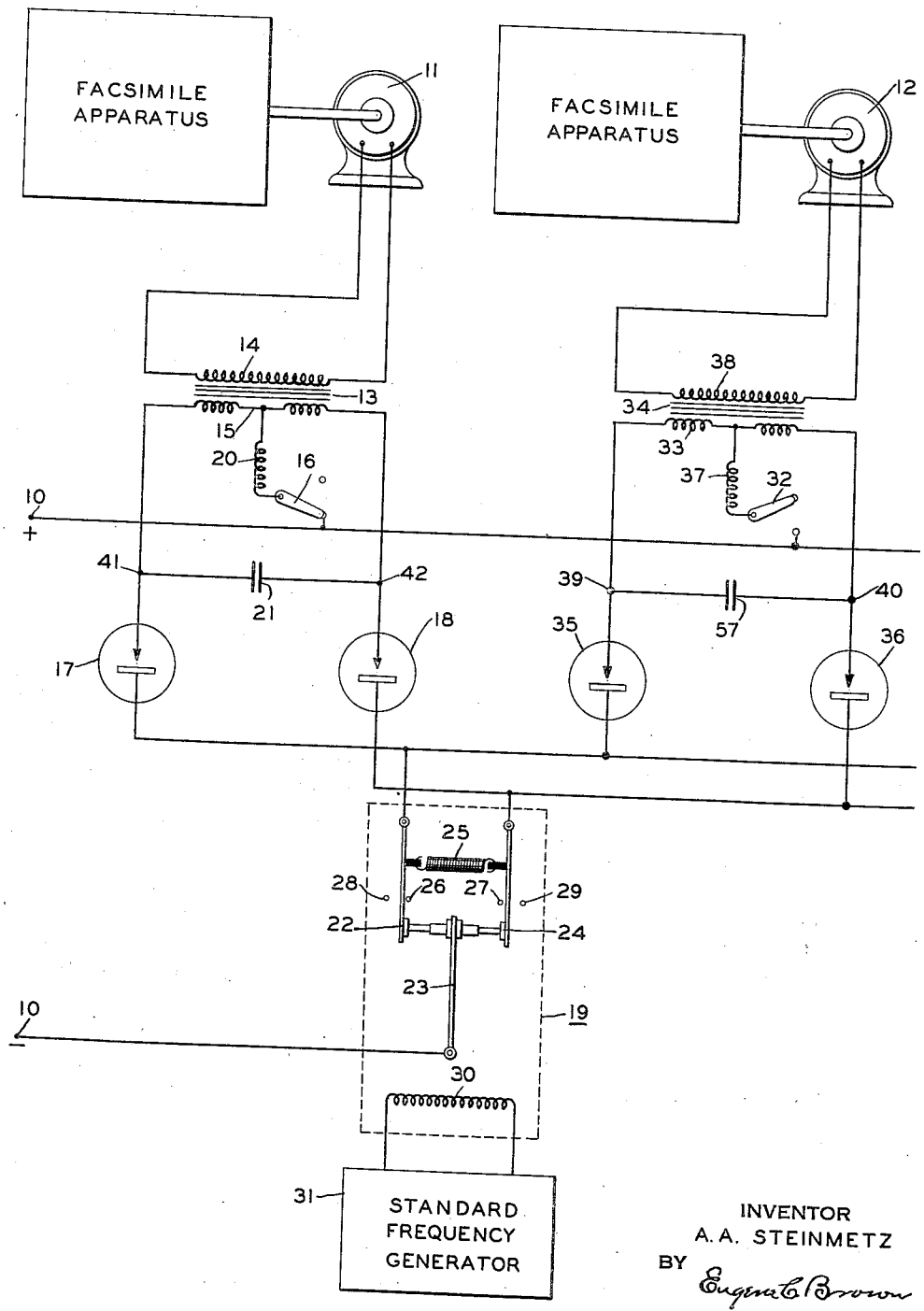

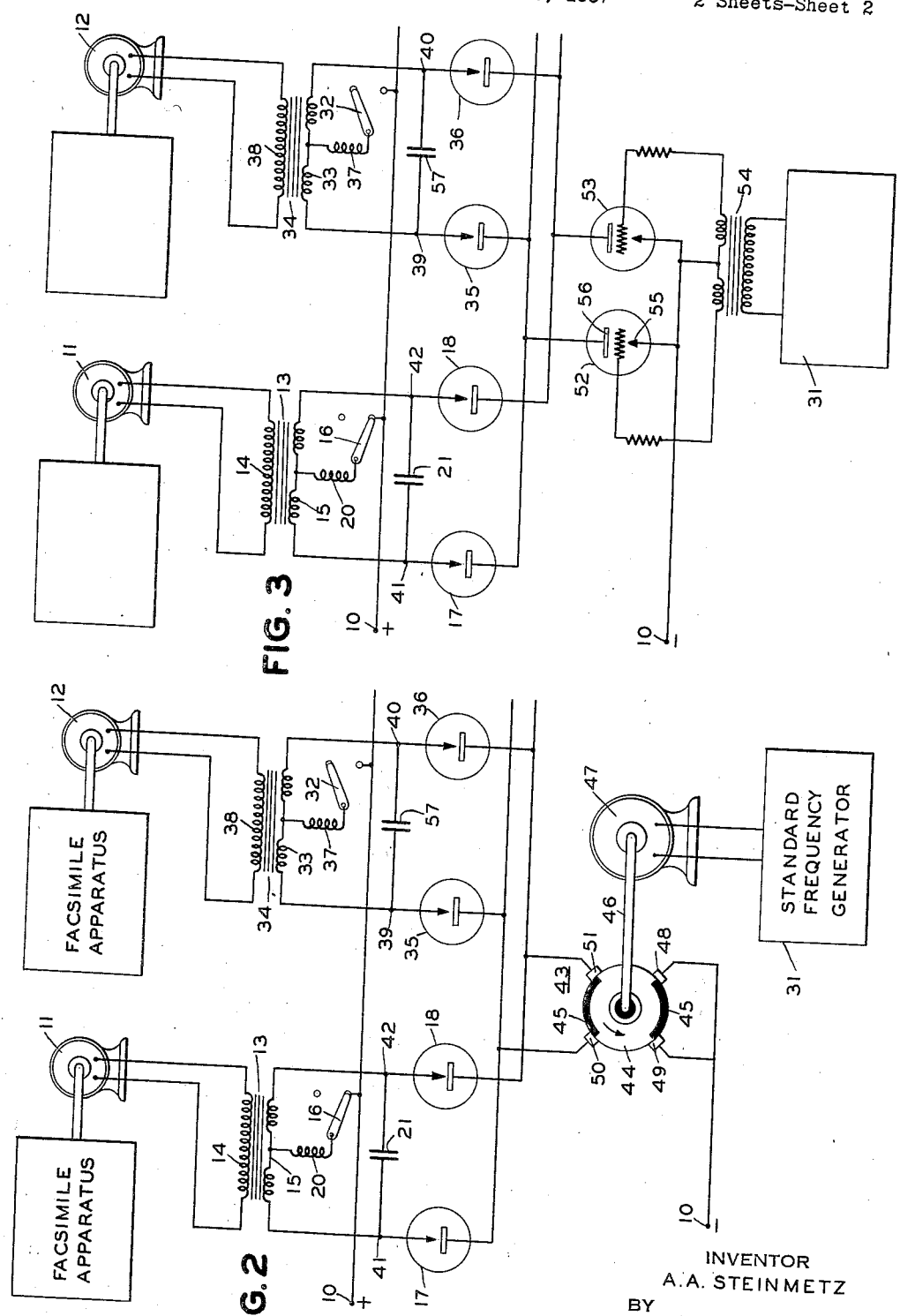

2,208,400

UNITED STATES PATENT OFFICE 2,208,400

ELECTRIC CONVERSION SYSTEM

Alfred A. Steinmetz, North Yonkers, N. Y., assignor to The Western Union Telegraph Company, New York, N. Y., a corporation of New York Application March 20, 1937, Serial No. 132,145

10 Claims. (Cl. 175—363)

This invention relates to electric conversion systems and apparatus and more particularly to an inverter embodying novel features for converting energy from a direct-current source into alternating current and supplying the same in a novel manner to a load circuit or circuits.

There are many exacting alternating-current loads which can not be supplied satisfactorily from any of the forms of a parallel inverter known in the art because of numerous limitations and disadvantages therein. For example, the driving means of facsimile apparatus at one terminal of a circuit not only must function in synchronism with the driving means of facsimile apparatus at the other terminal, but also a constant phase relation must be maintained between the two driving means in order that the image be reproduced without distortion. If a plurality of load units are supplied from the same secondary of the transformer of a parallel inverter of the kind known to the prior art, or from individual secondaries inductively coupled to a common primary, or from the secondaries of individual transformers whose primaries are connected in parallel to a common control device, a change in any of the load circuits is reflected to all other connected load circuits.

Another disadvantage of an electric valve converting apparatus of the prior art is the dependence of the tube deionization upon the load conditions. It is well known in the art that for the successful operation of a parallel inverter using gas filled thermionic tubes, fluctuations in load must be kept within definite limits which are determined by the circuit constants. The failure of the tubes to be deionized at the proper time renders the apparatus inoperative with the attendant inconvenience and possibility of damage to equipment, in addition to the shortening of the life of the tubes. Even under the best of conditions such a tube has but a limited life which, coupled with its relatively high cost, constitute very definite limitations and serious disadvantages to previously known converting apparatus employing electric valves for control means.

Therefore, it is a major object of this invention to provide an improved apparatus for the conversion of energy from a direct-current supply circuit which will overcome the above-mentioned limitations and disadvantages of the arrangements of the prior art and which will be simple, inexpensive both in initial and in maintenance costs, reliable in operation and flexible in its applications.

It is another object of this invention to provide an improved apparatus for converting energy from a direct-current source into alternating-current energy and supplying the converted energy to a plurality of independent alternating-current load circuits wherein the frequency of the output to the individual load units may be governed by a common control device and each load unit may be isolated so that load changes in one circuit have substantially no effect on other load units.

It is a further object of this invention to provide an improved converting apparatus of the parallel inverter type in which individual load units are supplied by independent transformers making possible the arrangement of apparatus to obtain voltages and wave forms best suited to the requirements of each individual load.

It is a still further object of this invention to provide an improved form of parallel inverter which utilizes for its control device thermionic means or electro-mechanical means, the latter means invariably performing its commutating function entirely independent of load conditions and circuit constants.

In accordance with one embodiment of this invention, a direct-current supply circuit and independent alternating-current load circuit or circuits are interconnected through converting apparatus of the general type known in the art as a parallel inverter. Each load circuit is supplied from the secondary of one of a plurality of transformers whose primaries are connected to a common control device. In each of the leads from the transformer primaries to the control means is an electric valve with such polarity that it is conductive to the unidirectional current drawn from the supply circuit.

For a better understanding of this invention, together with other and more specific objects thereof, reference is had to the following description taken in connection with the accompanying drawings, of which:

Fig. 1 is a diagrammatic illustration of a parallel inverter utilizing the features of this invention and controlled by a vibrator;

Fig. 2 is an illustration similar to Fig. 1 but showing a segmented commutator as a control device; and in Fig. 3, gas filled thermionic tubes act as the control means in an embodiment of the invention similar to those of Figs. 1 and 2.

Referring now more particularly to Fig. 1, there is illustrated a system for transmitting energy from a direct-current supply circuit 10 to a plurality of translating devices, for example, the synchronous alternating-current motors 11 and 12 which are shown as driving facsimile apparatus. These motors 11 and 12 are each interconnected with the direct-current supply circuit 10 by duplicate branches of the system; hence only one branch will be given a detailed consideration in this description. The apparatus of one branch comprises a transformer 13 provided with a secondary winding 14 connected to the synchronous motor 11 and with a primary winding 15 having an electrical midpoint connected to one side (preferably the positive) of the direct-current circuit 10 by the switch 16 and its end terminals connected to the other side of the direct-current circuit 10 through the electric valves 17 and 18 and the vibrator 19. A current smoothing reactor, or inductance device 20, is included in the connection from the positive side of the direct-current circuit 10 to the electrical midpoint of the primary winding 15 of the transformer 13, while a commutating capacitor 21 is connected across the primary winding 15 of the transformer 13 and between corresponding electrodes of the valves 17 and 18. The electric valves 17 and 18 may be of any type known in the art, although a preferred type is the copper oxide rectifier and these valves are connected with such polarities as to be conductive to the unidirectional current of the supply circuit 10.

The construction of the vibrator 19 is such that, before being disengaged from one of the contacts, for example the contact 22, the tongue 23 becomes engaged with the other contact 24 thus preventing an interruption of the current flow from the direct-current circuit 10. Contacts 22 and 24 are mechanically (but not electrically) connected by the tension spring 25 and are urged thereby inwardly toward the stop pins 26 and 27 respectively which are so positioned that the inward movement of one contact, for instance 22, is not arrested until the tongue 23 has moved into engagement with the other contact 24. Stop pins 28 and 29 are instrumental in limiting the outward movement of the respective contacts 22 and 24. In order to successively render the left and right portions of the primary winding 15 of the transformer 13 alternately conductive and nonconductive, the tongue 23 of the vibrator 19 is oscillated between the contacts 22 and 24 under the influence of the winding 30 which may be energized from any suitable generator 31 of alternating-current of the frequency with which it is desired to supply the synchronous motors 11 and 12. In the event that loads with less exacting requirements than those of the motor driven facsimile apparatus illustrated are to be supplied with alternating-current and it is not necessary to fix the frequency thereof, the winding 30 of vibrator 19 may be energized from the supplied alternating-current through any suitable phase-adjusting means, as is well understood by those skilled in the art.

In the operation of the apparatus of Fig. 1, if, as illustrated, the switch 16 is in its closed position and the switch 32 is for the present in its open position and one of the contacts of vibrator 19, for example the contact 22, is initially positioned against its outer stop pin 28 by a movement, toward the left as viewed in Fig. 1, of the tongue 23, current will flow from the positive side of the direct-current circuit 10 through the inductance device 20, the left hand portion of the primary winding 15 of the transformer 13, the electric valve 17 and the closed contact 22—23 of the vibrator 19 to the negative side of the direct-current circuit 10, thereby inducing a half cycle of alternating-current in the transformer 13. During this interval the capacitor 21 becomes charged, its right side being positive, to such a potential that when, substantially one hundred and eighty electrical degrees later, the tongue 23 of vibrator 19, in moving toward the right, engages the contact 24 just prior to its being disengaged from the contact 22, the capacitor 21, tending to discharge through the unidirectional valves 18 and 17, impresses on the valve 17 a counter voltage of sufficient magnitude to reduce substantially to zero the current flowing through it and contact 22—23 of vibrator 19. Consequently, in continuing its movement toward the right, the tongue 23 is then disengaged from the contact 22 with no appreciable arc resulting therefrom. Current now flows through the right hand portion of the primary winding 15 of transformer 13, inducing a half cycle of alternating-current of opposite polarity therein. In this manner the direct-current is successively conducted through alternate halves of the primary winding 15.

Now assume that, with the motor 11 running at a speed synchronous with the control frequency generator 31 and in a fixed phase relationship therewith, it is desired to add the load of the motor 12 to the alternating-current circuit of the inverter by closing the switch 32. The current supplied from the direct-current circuit 10 to energize the primary winding 33 of transformer 34 passes alternately through the electric valves 35 and 36, corresponding electrodes of which are connected in parallel with respective corresponding electrodes of the valves 17 and 18 to the contacts 22 and 24 respectively of the vibrator 19. Although the electrical midpoints of the primary windings 15 and 33 of transformers 13 and 34 are both connected through reactors 20 and 37 to one side of the direct-current circuit 10, there can be no interchange of energy between the two primary windings because of the valves 17, 18, 35 and 36. For example, it is well understood by those skilled in the art that the voltage existing between the end terminals of the primary winding 15 of the transformer 13 lags the control voltage of generator 31 to a degree inversely proportional to the load on the secondary winding 14. Hence, assume for the moment, that the transformer 34 is operating with its secondary winding 38 open-circuited and that the transformer 13 is operating with the load of motor 11 connected to its secondary winding 14. Then the voltage between points 39 and 40 is lagging the voltage between points 41 and 42. At the instant when the potential 39—40 is at its maximum value the potential 41—42 is declining from its maximum and there exists a potential difference between corresponding points in the two systems which tends to force current from the right hand branch supplying the motor 12 into the left hand branch supplying the motor 11, but which is prevented from so doing by the unidirectional valves 17 and 18. In a like manner any surges or other transient effects produced in the right hand branch by events occurring therein such as the closing or opening of switch 32, a variation in the mechanical load on motor 12 or a faulty motor will be confined exclusively to that branch. It follows that the circuit constants need not be identical in both systems but may be selected to suit the particular alternating-current loads being supplied therefrom.

It will be obvious to those skilled in the art that, while the foregoing description has disclosed two independent loads being supplied with alternating-current by the application of this invention, it is not contemplated that it be so limited, but can be further expanded to supply an indefinite number of alternating-current load units. The limiting factor in such an expansion is only the current carrying capacity of the contacting members 22, 23 and 24 of the vibrator 19 which, in accordance with the invention, are not required to interrupt currents of appreciable values.

Fig. 2 illustrates converting apparatus similar to that of Fig. 1 except that a commutator 43 is substituted for the vibrator as the control means. This commutator 43 comprises a circular disk 44 of conducting material with diametrically opposed transverse slots therein extending circumferentially substantially ninety degrees in width and into which are inserted insulating segments 45. The disk 44 is mounted on but insulated from a shaft 46 by which it is coupled to and rotated by, the synchronous motor 47 having as its source of energy the control frequency generator 31. It should be obvious that other constructions may be used for the commutator 43, such as one in which the disk 44 is of insulating material and the segments 45 are of conducting material suitably interconnected. Also, by suitably selecting and arranging the number of commutator segments and brushes, alternating-current may be supplied having substantially any frequency that is desired. Making wiping contact with the peripheral surface of the commutator 43 are four brushes 48, 49, 50 and 51 each having sufficient width and so disposed thereabout that, as the commutator is rotated, and conducting and non-conducting segments of substantially equal length are alternately contacted by each of the brushes, there exists at no time an open circuit between the negative side of the direct-current circuit 10 and the transformers 13 and 34. The duration of this bridging condition should be no longer than the time required for the successful commutation of the direct-current between the two portions of the primary windings 15 and 33 of transformers 13 and 34. If allowed to exist for a longer time than that, a larger value of the capacitor 21 would be required to sustain the countervoltage impressed upon either of the valves 17 or 18 during the commutating periods.

The operation of the commutator 43 as a control means in a converting system embodying the novel features of this invention will be well understood by those skilled in the art. In brief, assume that the commutator 43 is rotating anticlockwise as indicated by the arrow and that, at an instant just prior to that illustrated, the brushes 48 and 50 are in contact with the disk 44 and the brushes 49 and 51 are engaged with the insulating segments 45. Then, the direct current is being conducted through the left portion of the primary winding 15 of transformer 13 by the electric valve 17 and the disk 44 of the commutator 43 coacting with the brushes 48 and 50. When commutator 43 reaches the position illustrated in Fig. 2, the valve 18 is rendered conductive by the engagement of brushes 49 and 51 with the disk 44 while brushes 48 and 50 are still engaged therewith, thereby allowing the capacitor 21 to cooperate, as in Fig. 1, in commutating the current from the valve 17 to the valve 18 with a minimum of arcing as the disk 44, in continuing its rotation beyond the illustrated position, becomes disengaged from the brushes 48 and 50. Then, only the valve 18 is conducting and the right portion of primary winding 15 of transformer 13 is energized from the direct-current circuit 10. Subsequent operation continues in like manner, and, as described above, the switch 32 may be closed or opened, a fluctuating mechanical load applied to the motor 12, etc., without affecting in any way that part of the system supplying the motor 11 with alternating-current and vice versa.

A converting system embodying the invention may also employ as its control means the more familiar gas filled thermionic tubes with some attendant advantage over similar applications thereof in the prior art. Fig. 3 illustrates an inverter in accordance with this invention in which the control device is comprised of the electric valves 52 and 53, whose grids are influenced by the grid transformer 54 to alternately render the valves conducting. The transformer 54 is energized from the control frequency generator 31.

The function of this electric valve control means is, of course, similar to corresponding means in the arrangements of Figs. 1 and 2. Assume that the valve 52 is conducting the direct-current through the left portion of the primary winding 15 of transformer 13 and the valve 17. When conduction is initiated in the valve 53 by the reversal of the potential in the grid transformer 54, the capacitor 21, tending to discharge through valves 53 and 52, renders the cathode 55 of valve 52 positive with respect to its anode 56 for a period sufficiently long to permit the deionization of the valve 52, thereby rendering it non-conductive. In a like manner the valve 53 is subsequently made nonconducting as soon as conduction again starts in the valve 52.

It is well recognized in the art that, as the alternating-current load is increased, a corresponding increase must be made in the size of the capacitor and it has been common practice to select a capacitor capable of successfully commutating the direct-current between the control valves under maximum load conditions. However, under light load conditions the capacitor and the reactor may tend to oscillate to a higher voltage and thus increase the alternating-current voltage excessively unless some auxiliary means of mitigating this condition is included in the system. In converting apparatus in accordance with this invention when the alternating-current load is substantially increased, as for example by closing the switch 32 to start motor 12, the effective commutating capacitance is also increased by the capacitor 57.

Thus it is seen that there is provided by this invention converting apparatus in which a single device is employed to control the frequency of the alternating-current supplied to a plurality of load circuits that are otherwise electrically isolated from each other, and in which substantial fluctuations of load are accompanied by corresponding substantial changes in the commutating capacitance, thereby effecting a relatively close regulation of the alternating-current voltage together with satisfactory operation of the control means. This feature is of considerable importance to the functioning of an electric valve control device since insufficient commutating capacitance results in the complete failure of such a device, whereas, with electro-mechanical control means such as hereinbefore disclosed, it results only in excessive arcing between contacting members and will not interrupt the operation of the apparatus.

In the foregoing disclosure there has been illustrated and particularly described apparatus that may be employed as what, at present, are considered as preferred embodiments of this invention, but it will be obvious to those skilled in the art that various changes and modifications may be made without departing from the spirit thereof, and therefore, it is desired that only such limitations shall be placed thereupon as are imposed by the prior art or by the claims.

What is claimed is:

1. A converting system for transmitting energy from a direct-current supply circuit to a plurality of independent alternating-current load circuits each being interconnected with said supply circuit by individual branch circuits comprising an inductive winding, current reversing circuits therefor, means for successively rendering said reversing circuits alternately conductive and nonconductive, said means being common to all of said branch circuits, a commutating capacitor interconnecting said reversing circuits, an inductance device interposed between said branch circuit and said supply circuit, and an electric valve connected in each of said reversing circuits to prevent the transmission of energy from the reversing circuits of one of said branches to the reversing circuits of other branches.

2. A converting system for transmitting energy from a direct-current supply circuit to a plurality of independent alternating-current load circuits each being interconnected with said supply circuit by individual branch circuits comprising an inductive winding, current reversing circuits therefor, electro-mechanical means for successively rendering said reversing circuits alternately conductive and nonconductive, said means being common to all of said branch circuits, a commutating capacitor interconnecting said reversing circuits, an inductance device interposed between said branch circuit and said supply circuit, and an electric valve connected in each of said reversing circuits to confine the effects of load variation to those of said load circuits in which said variation occurs.

3. A converting system for transmitting energy from a direct-current supply circuit to a plurality of independent alternating-current load circuits each being interconnected with said supply circuit by individual branch circuits comprising an inductive winding, current reversing circuits therefor, thermionic means for successively rendering said reversing circuits alternately conductive and nonconductive, said means being common to all of said branch circuits, a commutating capacitor interconnecting said reversing circuits, an inductance device interposed between said branch circuit and said supply circuit, and an electric valve connected in each of said reversing circuits to maintain a constant phase relationship between each of said load circuits and said thermionic means.

4. A converting system for transmitting energy from a direct-current supply circuit to a plurality of independent alternating-current load circuits each being interconnected with said supply circuit by individual branch circuits comprising an inductive winding, current reversing circuits therefor, vibrator means for successively rendering said reversing circuits alternately conductive and nonconductive, said means being common to all of said branch circuits, a commutating capacitor interconnecting said reversing circuits, an inductance device interposed between said branch circuit and said supply circuit, and an electric valve connected in each of said reversing circuits to permit the potential of one of said inductive windings to differ in value substantially from the potential of any of the other of said inductive windings at any instant.

5. A converting system for transmitting energy from a direct-current supply circuit to a plurality of independent alternating-current load circuits each being interconnected with said supply circuit by individual branch circuits comprising an inductive winding, current reversing circuits therefor, commutator means for successively rendering said reversing circuits alternately conductive and nonconductive, said means being common to all of said branch circuits, a commutating capacitor interconnecting said reversing circuits, an inductance device interposed between said branch circuit and said supply circuit, and an electric valve connected in each of said reversing circuits to permit the potential of one of said inductive windings to differ in phase substantially from the potential of any of the other of said inductive windings.

6. A converting system for transmitting energy from a direct-current supply circuit to a plurality of independent alternating-current load circuits each being interconnectable with said supply circuit by individual branch circuits comprising an inductive winding, current reversing circuits therefor, means for successively rendering said reversing circuits alternately conductive and nonconductive, said means being common to all of said branch circuits, a commutating capacitor interconnecting said reversing circuits, an inductance device interposed between said branch circuit and said supply circuit, and an electric valve connected in each of said reversing circuits whereby when any of said branch circuits is rendered operative or inoperative a corresponding change in the total commutating capacitance may be made automatically without affecting in any manner the functioning of any other operating branch circuits of said system.

7. A converting system for transmitting energy from a direct current supply circuit to a plurality of independent alternating-current load circuits each interconnectable with said supply circuit by individual branch circuits comprising an inductive winding, current reversing circuits therefor, electro-mechanical means for successively rendering said reversing circuits alternately conductive and nonconductive, said means being common to all of said branch circuits, a commutating capacitor interconnecting said reversing circuits, an inductance device interposed between said branch circuit and said supply circuit, and an electric valve connected in each of said reversing circuits to prevent any change in the load on any of said alternating-current circuits from producing a change in the phase relation between said electromagnetic means and the potential of any other of said alternating-current circuits.

8. In a converting system for transmitting energy from a direct-current source to a plurality of independent alternating-current load circuits, output transformers for each of said circuits, said transformers each comprising a secondary output winding and a center tapped primary input winding, inductance means connecting said center tap to one side of said direct-current sources, electric valves connecting the extremities of said primary winding to contacts of a control device, said device being common to all of said transformers, standard frequency generating means for oscillating the tongue of said control device, which is connected to the opposite side of said direct-current source, between said contacts in a manner to provide a continuous flow of current from said direct-current source; a capacitor connected between the extremities of each of said primary input windings, the polarity of said electric valves being such as to be conductive only to the unidirectional current flow from said direct-current source, said valves preventing an interchange of energy between the circuits associated with one of said primary windings and the circuits associated with any others of said primary windings.

9. A converting system for transmitting energy from a direct-current supply circuit to a plurality of independent alternating current load circuits each being interconnected with said supply circuit by individual branch circuits comprising an inductive winding, current reversing circuits therefor, means for successively rendering said reversing circuits alternately conductive and nonconductive, said means being common to all of said branch circuits, and an electric valve connected in each of said reversing circuits to prevent the transmission of energy from the reversing circuits of one of said branches to the reversing circuits of other branches.

10. A converting system comprising a direct current supply circuit, a plurality of alternating current output circuits, current reversing circuits for each of said output circuits, means common to said output circuits for rendering said reversing circuits alternately conductive and non-conductive, electric valve means in each of said reversing circuits adjacent to said first named means to prevent the transmission of energy from one of said reversing circuits to another of said reversing circuits, and means independent of said alternating current output circuits for operating said means for rendering each of said reversing circuits alternately conductive and non-conductive.

ALFRED A. STEINMETZ.